United States Patent
Ho

(10) Patent No.: US 11,801,584 B2
(45) Date of Patent: Oct. 31, 2023

(54) CHUCK STRUCTURE

(71) Applicant: OXTI CORPORATION, New Taipei (TW)

(72) Inventor: Chih-Feng Ho, New Taipei (TW)

(73) Assignee: OXTI CORPORATION, New Taipei (TW)

( * ) Notice: Subject to any disclaimer, the term of this patent is extended or adjusted under 35 U.S.C. 154(b) by 101 days.

(21) Appl. No.: 17/564,232

(22) Filed: Dec. 29, 2021

(65) Prior Publication Data

US 2023/0202001 A1 Jun. 29, 2023

(51) Int. Cl.
| | |
|---|---|
| *B25B 3/00* | (2006.01) |
| *B23B 31/02* | (2006.01) |
| *B23B 31/117* | (2006.01) |
| *B23B 31/103* | (2006.01) |

(52) U.S. Cl.
CPC .............. *B25B 3/00* (2013.01); *B23B 31/021* (2013.01); *B23B 31/103* (2013.01); *B23B 31/1173* (2013.01)

(58) Field of Classification Search
CPC ........... B25B 5/145; B25B 5/142; B25B 5/00; B25B 5/003
See application file for complete search history.

(56) References Cited

U.S. PATENT DOCUMENTS

| | | | | |
|---|---|---|---|---|
| 3,552,733 A * | 1/1971 | Pickett | ..................... | G01N 1/06 83/915.5 |
| 5,092,572 A * | 3/1992 | Litwak | ................... | A61B 90/50 269/282 |
| 5,906,034 A * | 5/1999 | Weisshaar | ............. | B25B 27/023 269/93 |
| 10,655,779 B2 * | 5/2020 | Janway | ................. | A61M 39/28 |
| 2016/0067845 A1 * | 3/2016 | Quaiz | ..................... | B25B 5/006 29/559 |

* cited by examiner

*Primary Examiner* — Lee D Wilson
(74) *Attorney, Agent, or Firm* — Leong C. Lei

(57) ABSTRACT

A chuck structure includes: a first chuck, provided with a seat slidable relatively thereto, the seat provided with a first stop; a limiting element, swingable relatively to the seat, and provided with a second chuck; and an operating element, respectively connected with the limiting element and a second chuck, and driving the second chuck to move relatively to the first chuck to form an accommodation space between the first chuck and second chuck, an elastic element configured between the operating element and limiting element, and the elastic element pressing against the limiting element to approach the seat, allowing the second and first stops to be in contact with each other. The present invention can use the operating element 3 to adjust the size of the accommodation space, and the second stop in contact with first stop to make the operating element can only be rotated in a single direction.

5 Claims, 7 Drawing Sheets

CHUCK STRUCTURE

TECHNICAL FIELD OF THE INVENTION

The present invention relates to a chuck, and more particularly to a chuck structure for holding objects.

DESCRIPTION OF THE PRIOR ART

Taiwan Patent Publishing No. 201414592, titled "Chuck Strengthening Structure", includes a support and pressing mechanism, where the support includes a first support arm, second support arm and assembly member, where the assembly member is passed through the ends of the first and second support arms, and both the first and second support arms are provided with an inner support rod and outer covering layer, where the inner support rod is made of metal, and the outer covering layer strengthening plastics; the pressing mechanism includes a threaded rod section engaged with the second support arm. Thus, the pressing mechanism can clamp an object or objects when turned.

During operation, it is necessary to hold a force-applying handle of the pressing mechanism, and the handle is further turned to cause the pressing mechanism to move relatively toward the first support arm, making the pressing mechanism approach the first support arm, and the object can be clamped through the clamping end and pressing end. However, when the clamping is released, the pressing mechanism needs to be screwed in the opposite direction to move relative to the first support arm, so that the pressing mechanism moves away from the first support arm, which has the disadvantages such as operational inconvenience, and time and labor consumption.

SUMMARY OF THE INVENTION

To overcome the above disadvantages, the present invention proposes a chuck structure, including: a first chuck, provided with a seat slidable relatively thereto, the seat provided with a first stop; a limiting element, swingable relatively to the seat, and provided with a second chuck; and an operating element, respectively connected with the limiting element and a second chuck, and driving the second chuck to move relatively to the first chuck to form an accommodation space between the first chuck and second chuck, an elastic element configured between the operating element and limiting element, and the elastic element pressing against the limiting element to approach the seat, allowing the second stop and first stop to be in contact with each other, where the first stop and second stop respectively are a one-way sawtooth shaped body,
where the first chuck is provided with a rail, and the seat is slidably configured in the rail,
where the operating element and second chuck are slidably connected to each other,
where the first chuck is provided with a protrusion.

The present invention can use the operating element 3 to adjust the size of the accommodation space, and further can use the second stop in contact with the first stop to make the operating element can only be rotated in a single direction. In addition, the direction restriction on the operating element can also be released by pushing the limiting element.

DETAILED DESCRIPTION OF THE PREFERRED EMBODIMENTS

Figure 1:
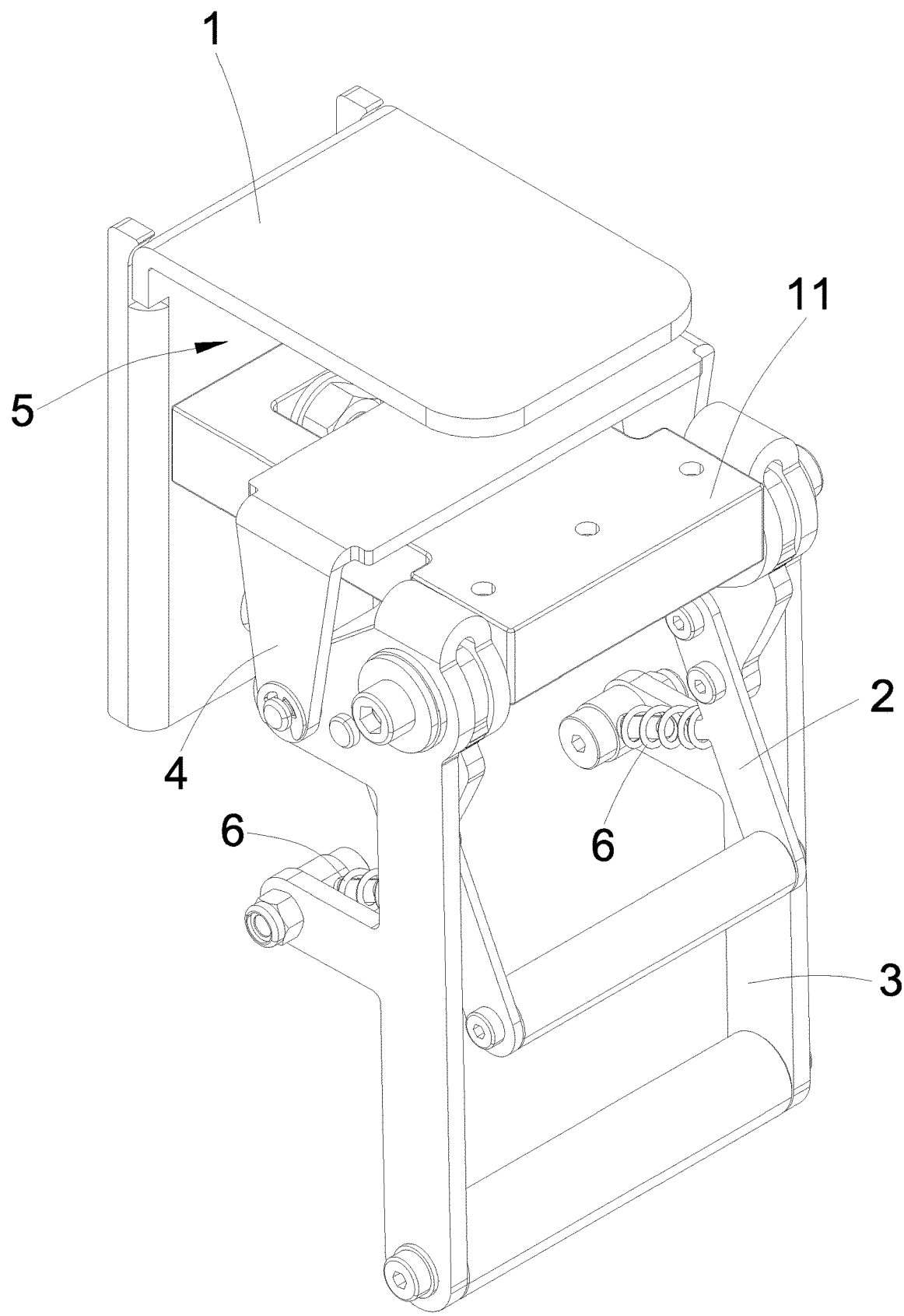
FIG. 1 is a perspective view of a chuck structure of the present invention.

Referring to FIG. 1, a chuck structure of the present invention includes a first chuck 1, limiting element 2 and operating element 3.

Figure 2:
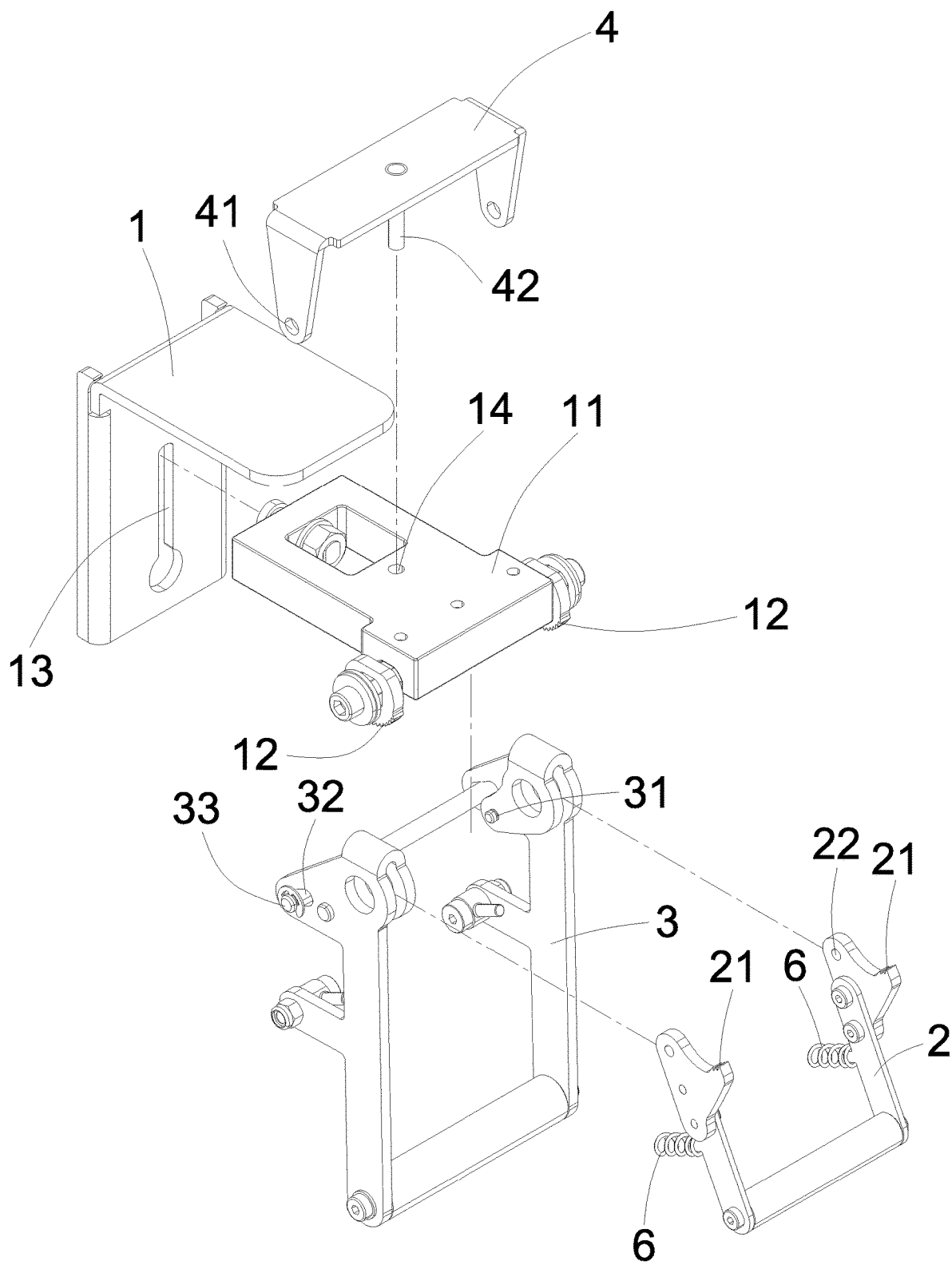
FIG. 2 is an exploded view of the chuck structure of the present invention.
Figure 3:
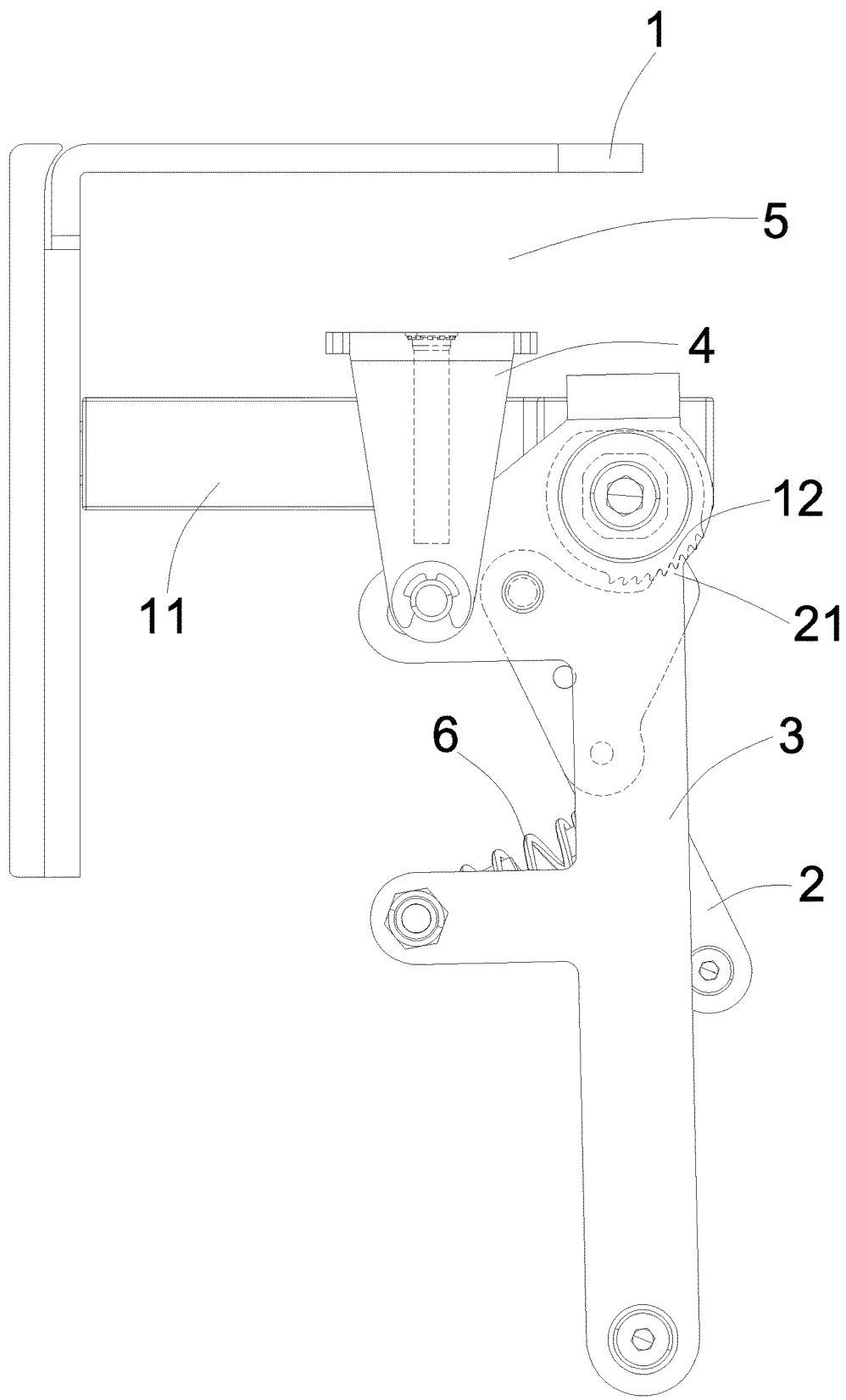
FIG. 3 is a side view of the chuck structure of the present invention.

Referring to FIGS. 2 and 3, the first chuck 1 is provided with a seat 11 slidable relatively to the first chuck 1, where the seat 11 is provided with a first stop 12. Specifically, the first chuck 1 is provided with a rail 13, and the seat 11 is slidably configured in the rail 13, allowing the seat 11 to be slid relatively to the first chuck 1. The first stop 12 is one-way sawtooth shaped body similar to a ratchet.

The limiting element 2 can be swung relatively to the seat 11 and is provided with a second stop 21. Specifically, the second stop 21 is also a one-way sawtooth typed body similar to a ratchet. The second stop 21 and first stop 12 correspond to each other.

The operating element 3 is respectively connected with the limiting element 2 and a second chuck 4 and drives the second chuck 4 to move relatively to the first chuck 1 to form an accommodation space 5 between the first chuck 1 and second chuck 4. Furthermore, an elastic element 6 is configured between the operating element 4 and limiting element 2, and the elastic element 6 presses against the limiting element 2 to approach the seat 11, allowing the second stop 21 to be in contact with the first stop 12. Specifically, the connection of the operating element 3 with the limiting element 2 is formed by a bearing 31 of the operating element 3 and an axial hole 22 of the limiting element 2 in a rotating connection shape. The connection between the operating element 3 and second chuck 4 is formed by a rectangular hole 32 of the operating element 3, locking element 33 and a fixing hole 41 of the second chuck 4 in sliding connection shape, namely, the operating element 3 is in sliding connection with the second chuck 4. Furthermore, a protrusion 42 of the second chuck 4 is passed through a through hole 14 of the seat 11, allowing the operating element 3 to drive the second chuck 4 to move perpendicularly relatively to the first chuck 1, where the elastic element 6 may be a spring.

Figure 4:
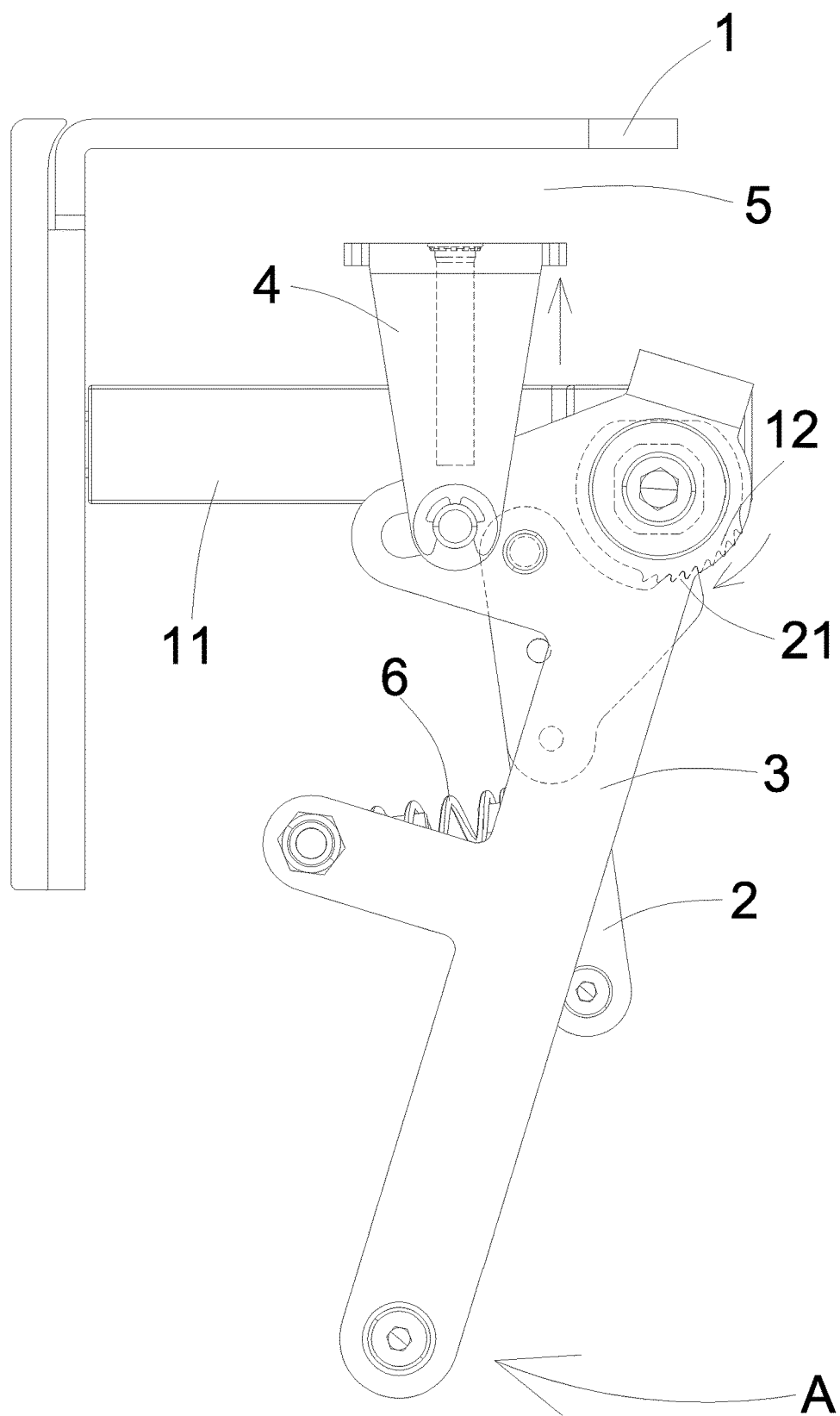
FIG. 4 is a schematic view of the chuck structure of the present invention, where an operating element drives a second chuck connected thereto to move relatively to a first chuck.
Figure 5:
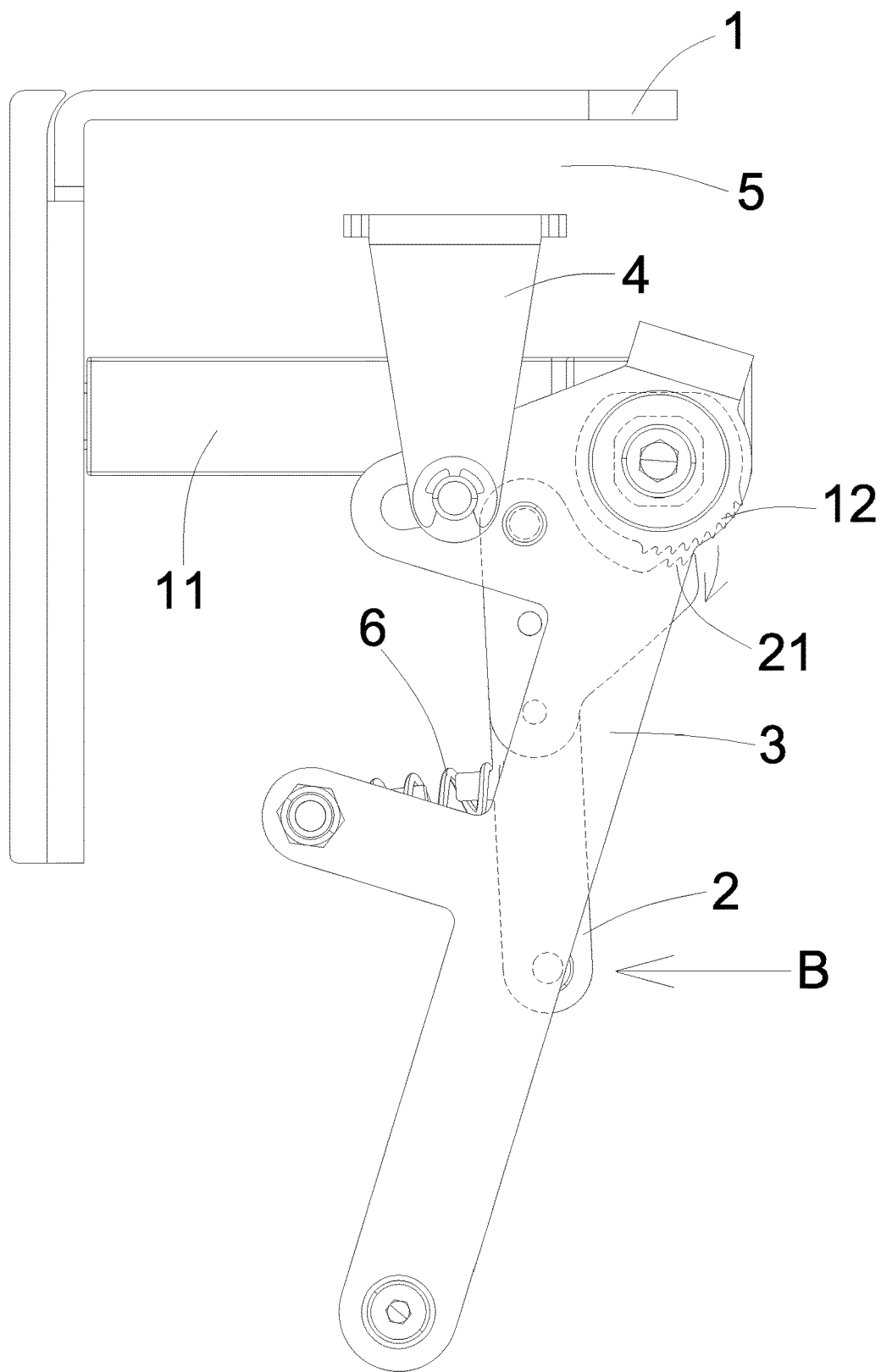
FIG. 5 is a schematic view of the chuck structure of the present invention, where a limiting element is pushed to make a first stop and second stop separate from each other.

Referring to FIG. 3, in an initial state, since both the second stop 21 of the limiting element 2 and the first stop 12 of the seat 11 respectively are a one-way sawtooth shaped body, and the operating element 3 and the limiting element 2 are connected to each other, the operating element 3 can only be allowed to be rotated in a single direction (that is, the direction of arrow A in FIG. 4) by contacting the second stop 21 with first stop 12. Referring to FIG. 4, the operating element 3 is pushed in the direction of arrow A upon operation to make the operating element 3 drive the second chuck 4 in connection therewith to move relatively to the first chuck 1, and the size of the accommodation space 5 can then be adjusted through the operating element 3. Referring to FIG. 5, the limiting element 2 can be pushed away from the seat 11 in the direction of arrow B upon release to make the second stop 21 and first stop 12 separate from each other, and the operating element 3 can then drive the second chuck 4 in connection therewith to move relatively to the first chuck 1 again, and after stopping pushing the limiting element 2, the elastic element 6 between the operating element 3 and limiting element 2 will press against the limiting element 2 again to approach the seat 11, allowing the second stop 21 and first stop 12 to be in contact with each other to make operating element 3 can only be rotated in a single direction.

Figure 6:
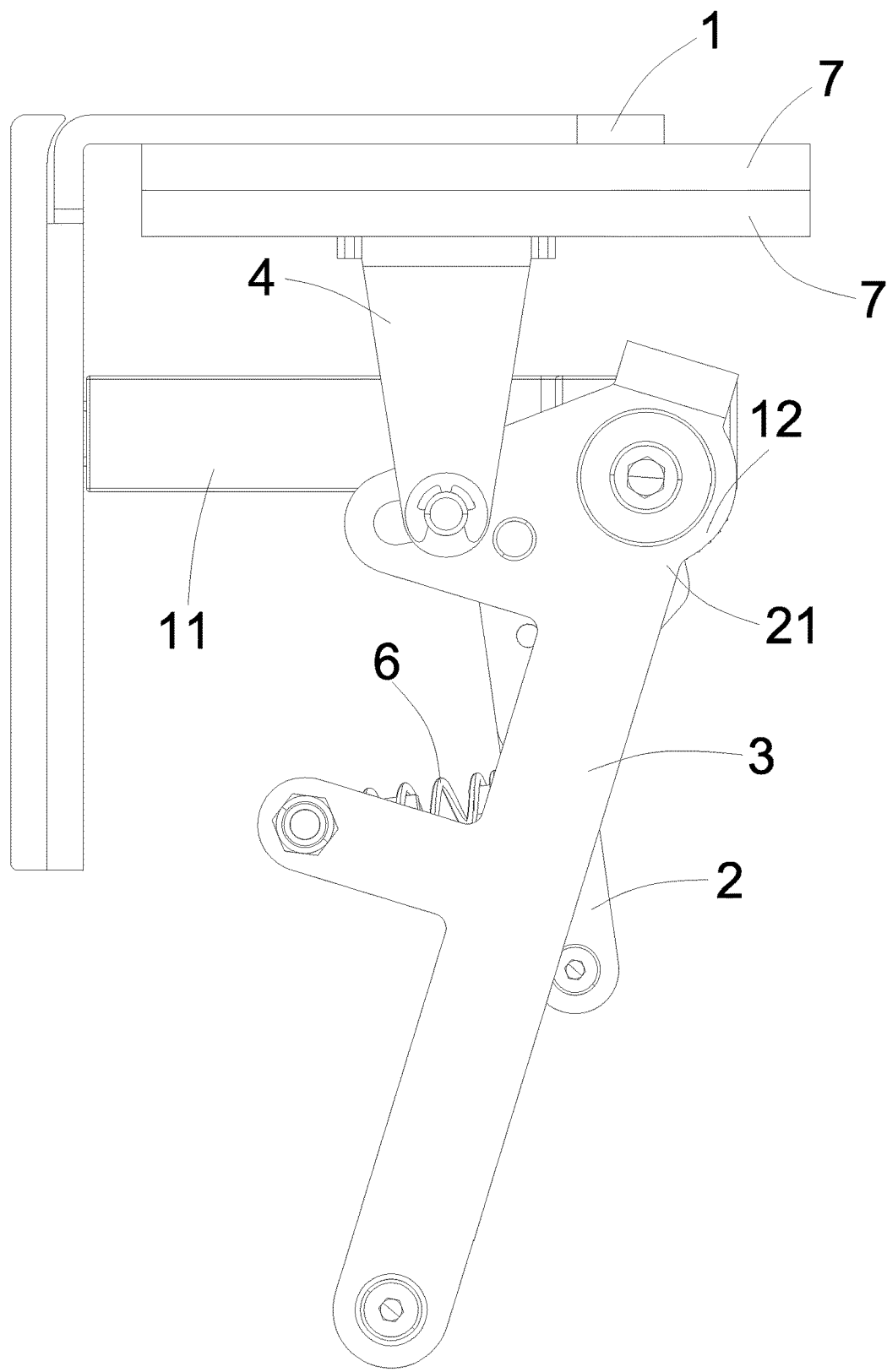
FIG. 6 is a schematic view of the chuck structure of the present invention, where objects are clamped thereby.

Referring to FIG. 6, the chuck structure of the present invention can be used to clamp an object or objects.

Figure 7:
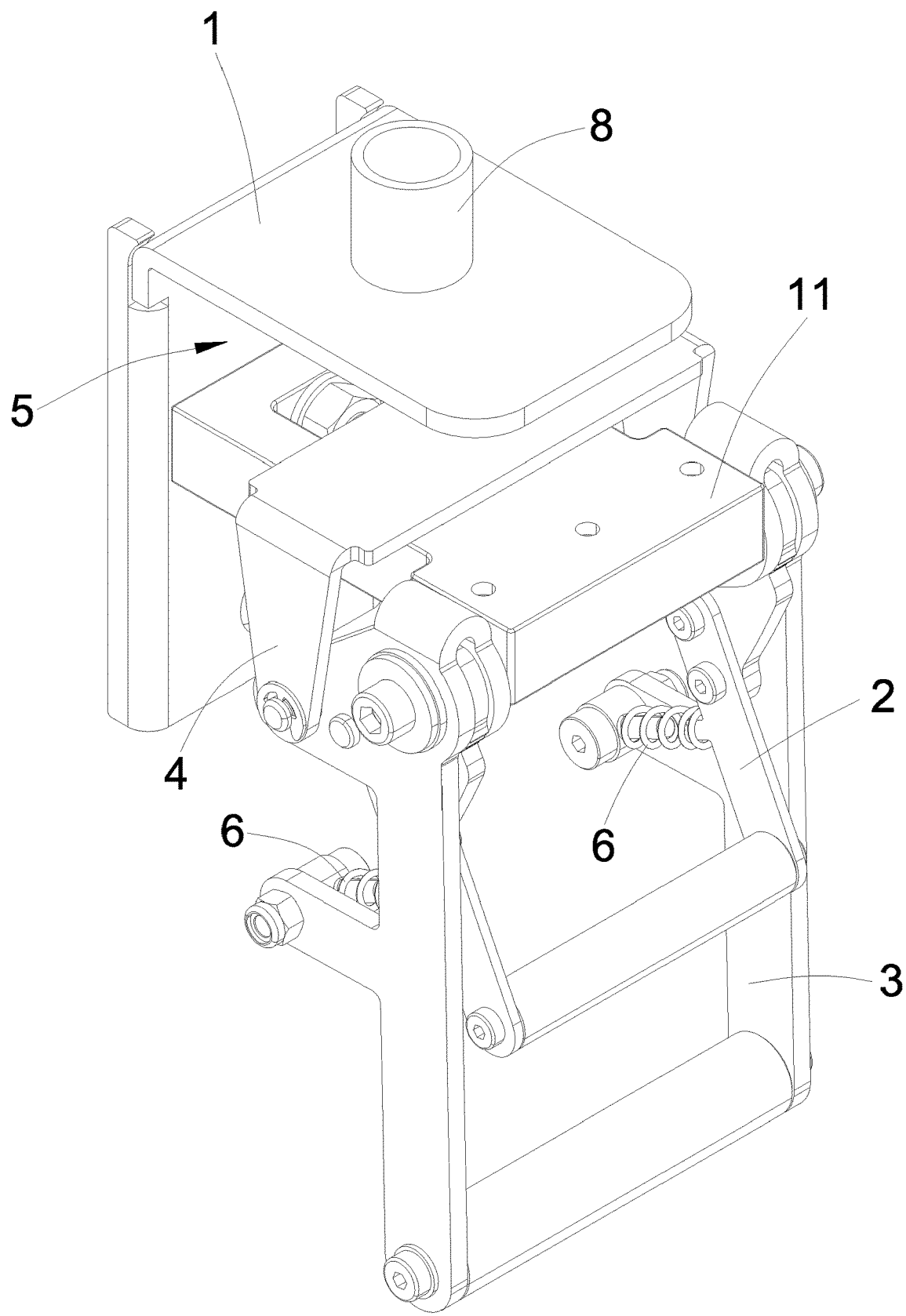
FIG. 7 is a perspective view of the chuck structure of the present invention, where the first chuck is provided with a protrusion.

Referring to FIG. 7, the first chuck 1 may be provided with a protrusion 8 adapted to be in combination with an electronic device to fix the electronic device.

The present invention can use the operating element 3 to adjust the size of the accommodation space 5, and further can use the second stop 21 in contact with the first stop 12 to make the operating element 3 can only be rotated in a single direction. In addition, the direction restriction on the operating element 3 can also be released by pushing the limiting element 2.

I claim:

1. A chuck structure, comprising:
   a first chuck, provided with a seat slidable relatively thereto, said seat provided with a first stop;
   a limiting element, swingable relatively to said seat, and provided with a second chuck; and
   an operating element, respectively connected with said limiting element and the second chuck, and driving said second chuck to move relatively to said first chuck to form an accommodation space between said first chuck and second chuck, an elastic element configured between said operating element and limiting element, and said elastic element pressing against said limiting element to approach said seat, allowing said second stop and first stop to be in contact with each other.

2. The structure according to claim 1, wherein said first stop and second stop respectively are a one-way sawtooth shaped body.

3. The structure according to claim 1, wherein said first chuck is provided with a rail, and said seat is slidably configured in said rail.

4. The structure according to claim 1, wherein said operating element and second chuck are slidably connected to each other.

5. The structure according to claim 1, wherein said first chuck is provided with a protrusion.

\* \* \* \* \*